US007344392B2

(12) United States Patent
Rubin et al.

(10) Patent No.: US 7,344,392 B2
(45) Date of Patent: Mar. 18, 2008

(54) SYSTEM AND METHOD FOR DISTRIBUTION OF ELECTRICAL POWER

(75) Inventors: Richard J Rubin, York Harbor, ME (US); Lawrence W. Ellis, Wakefield, MA (US)

(73) Assignee: Boston Metal Products Corporation, Wakefield, MA (US)

( * ) Notice: Subject to any disclaimer, the term of this patent is extended or adjusted under 35 U.S.C. 154(b) by 0 days.

(21) Appl. No.: 11/439,648

(22) Filed: May 24, 2006

(65) Prior Publication Data

US 2007/0026702 A1    Feb. 1, 2007

Related U.S. Application Data

(60) Provisional application No. 60/684,248, filed on May 24, 2005.

(51) Int. Cl.
*H01R 4/66* (2006.01)
(52) U.S. Cl. .................................................. 439/108
(58) Field of Classification Search ................ 439/215, 439/108, 505, 502, 517, 34, 404, 211, 188, 439/589, 213, 709, 786; 361/659–662, 601, 361/641, 652, 664, 665, 668, 627
See application file for complete search history.

(56) References Cited

U.S. PATENT DOCUMENTS 3,835,440 A * 9/1974 Clarke .......................... 439/213
4,546,418 A * 10/1985 Baggio et al. ................. 362/85

5,675,194 A    10/1997 Domigan
6,266,233 B1 *  7/2001 O'Regan ..................... 361/659
2006/0084309 A1 *  4/2006 Kondas ....................... 439/215

FOREIGN PATENT DOCUMENTS

| EP | 0 516 923 | 12/1992 |
| GB | 1 387 196 | 3/1975 |
| WO | WO 04/038879 | 5/2004 |

* cited by examiner

*Primary Examiner*—P. Austin Bradley
*Assistant Examiner*—Edwin A Leon
(74) *Attorney, Agent, or Firm*—Rissman Jobse Hendricks & Oliverio

(57) ABSTRACT

An electrical power distribution system comprising:
a housing containing a circuit splitting mechanism that splits an original source of electrical power into a plurality of high voltage or amperage circuits;
a first modular connector mounted for access on an outside surface of the housing, the first modular connector comprising a plurality of first conductive contacts, each first contact being electrically connected to a corresponding one of the plurality of circuits, the first contacts being mounted in an electrically nonconductive support material that deters manual contact by the user, the first contacts being arranged in the support material in predetermined mating pattern;
a second modular connector comprising a plurality of second conductive contacts for mating with the plurality of first contacts, each of the second contacts being electrically connected to one end of a corresponding one of a plurality of wires and mounted in the second modular connector in a pattern complementary to the predetermined mating pattern of the first contacts.

6 Claims, 6 Drawing Sheets

SYSTEM AND METHOD FOR DISTRIBUTION OF ELECTRICAL POWER

RELATED APPLICATIONS

This application claims the benefit of priority under 35 U.S.C. Sections 119 and/or 120 to the extent applicable to U.S. Provisional patent application Ser. No. 60/684,248 filed May 24, 2005.

FIELD OF THE INVENTION

The present invention relates to electrical power distribution systems and more particularly to a modular system for readily installing apparatus that provides for the distribution of power throughout the interior of a building in a pre-configured manner.

BACKGROUND OF THE INVENTION

Installing electrical power lines and wiring within buildings, particularly within large buildings, normally requires a custom/different configuration in the field for each locale and installation of a multitude of custom made conduits, railings, overhead struts, wiring and cabling, assemblies for supporting electrical components, tubing, circuit splitting and electrically powered device interconnections. Pre-existing electrical power distribution components have been devised for expediting the installation of electrical power throughout buildings. Devices such as switch assemblies, power panels, circuit breaker boxes, multi-circuit cabling and the like have been employed in the past in the set-up of large scale power distribution systems. The task of connecting a master or original source of power to the multitude of individual devices that are typically used within a building that require electrical power remains a labor intensive task of routing and connecting individual wires or collections of wires along extensive distances that are disposed along overhead, underground or floor level locations.

SUMMARY OF THE INVENTION

In one aspect of the invention there is provided an elongated flexible tube that houses a plurality of wires, each wire capable of carrying a relatively high current of at least about 5 amperes or about 42 volts at 50/60 hertz, each wire being conductively connected at opposite ends to a connector contact, the connector contacts being mounted at each end of the tube in a connector housing and arranged as a set of contacts in a predetermined pattern for mating with a complementary set of conductive contacts mounted in a complementary pattern in a complementary housing, the complementary contacts being matable to conduct the relatively high current between the mated contacts. The set of contacts mounted at one end of the tube preferably comprise projections that are manually insertable and snug fittable within a complementary set of receptacles. The set of contacts mounted at the other end of the tube preferably comprise receptacles that receive a complementary set of projections that are manually insertable and snug fittable within the receptacles. Each connector mounted at the ends of the tube typically have at least about 8 separate contacts that interconnect through their complementary connectors to at least about 8 separate circuits of at least about 5 amperes or about 42 volts. The contacts of one of the complementary connectors that connect to the projections of one of the connectors mounted on one of the tube are each preferably conductively connected to separate circuits that are split in parallel from a master or original source of electrical power of at least about 90 amperes.

The present invention further provides an electrical power distribution system comprising:

an original source of electrical power;

a housing mounted on a ground level surface in a location that is readily manually accessible by a user standing on the ground level surface, the original source of electrical power being routed into the housing, the housing containing a splitting mechanism that splits the original source of power into a plurality of circuits, (typically at least about 8 circuits);

a first modular connector mounted for access on an outside surface of the housing, the first modular connector having a plurality of first electrical contacts (typically at least about 8), each first contact being electrically connected to a corresponding one of the plurality of circuits;

an elongated flexible tube housing a plurality of electrically conductive wires, the tube having a second modular connector mounted at one end of the tube, the second modular connector having a plurality of second electrical contacts (typically at least about 8) for mating with the plurality of first electrical contacts, each of the second contacts being electrically connected to one end of a corresponding one of the plurality of wires;

wherein the plurality of first and second contacts are mounted within the first and second connectors respectively in a complementary mating arrangement that is adapted to enable the first and second contacts to be readily manually mated with each other and to be readily manually disengaged from each other, the first and second contacts having a mass or size selected to conduct elevated current or voltage between the contacts.

Preferably, the elongated flexible tube has a third modular connector mounted at another end of the tube opposite the one end of the tube, the third modular connector having a plurality of third electrical contacts (typically at least about 8), each of the third contacts being electrically connected to an opposite end of a corresponding one of the wires.

Most preferably, the system includes a circuit distribution housing having a fourth modular connector mounted for access on an outside surface of the housing, the fourth modular connector having a plurality of fourth contacts for mating with the plurality of third electrical contacts (typically at least about 8), wherein the plurality of third and fourth contacts are mounted within the third and fourth connectors respectively in a complementary arrangement that is adapted to enable the plurality of third and fourth contacts to be readily manually mated with each other in a predetermined pattern and to be readily manually disengaged from each other.

The plurality of fourth connectors are typically each connected to a corresponding wire that is housed at least in part within the circuit distribution housing, the circuit distribution housing being mounted in a location remote from the housing mounted on the ground level surface.

Each of the first and second contacts typically comprise a material and have a size or mass selected to enable a circuit to conduct between the first and second contacts having a measurable current of at least about 5 amperes or having a voltage of at least about 42 volts at 50/60 hertz.

Each of the plurality of first contacts and their corresponding second contacts preferably have a pre-selected complementary dimensional configuration, the pre-selected dimensional configuration of the plurality of contacts being selected such that the first and second contacts can only be mated together in a single selected mating orientation.

The first contacts of the first connector preferably comprise electrically conductive receptacles surrounded by an electrically non-conductive or shielding material and the second contacts of the second connector comprise electrically conductive projections that are each selectively shaped to snugly fit within a corresponding complementarily shaped receptacle of the first connector.

The third contacts of the third connector typically comprise electrically conductive receptacles surrounded by an electrically non-conductive or shielding material and the fourth contacts of the fourth connector comprise electrically conductive projections that are each selectively shaped to snugly fit within a corresponding complementarily shaped receptacle of the third connector.

The first and second contacts are preferably arranged in a first unique mating pattern or arrangement and the third and fourth contacts are preferably arranged in a second unique mating pattern or arrangement different from the first pattern or arrangement. The projections of the first connector preferably have a longest projection having a longest selected length and either the receptacles or the projections of the first and second connectors are surrounded by a collar having a selected depth that is at least as large as the longest selected length of the longest projection of the second connector. The projections of the fourth connector preferably have a longest projection having a longest selected length and either the receptacles or the projections of the third and fourth connectors are surrounded by a collar having a selected depth that is at least as large as the longest selected length of the longest projection of the fourth connector.

In another aspect of the invention there is provided an electrical power distribution system comprising:

an original source of electrical power;

a housing mounted on a ground level surface in a location that is readily manually accessible by a user standing on the ground level surface, the housing containing a circuit splitting mechanism that splits the original source of electrical power into a plurality of circuits of at least about 5 amperes or at least about 42 volts at 50/60 hertz;

a first modular connector mounted for access on an outside surface of the housing, the first modular connector having a plurality of first electrical contacts, each first contact being electrically connected to a corresponding one of the plurality of circuits;

a second modular connector having a plurality of second electrical contacts for mating with the plurality of first electrical contacts, each of the second contacts being electrically connected to one end of a corresponding one of a plurality of wires;

wherein the plurality of first and second contacts are mounted within the first and second connectors respectively in a complementary mating arrangement that is adapted to enable the first and second contacts to be readily manually mated with each other and to be readily manually disengaged from each other;

a third modular connector having a plurality of third electrical contacts, each of the third contacts being electrically connected to an opposite end of a corresponding one of the wires.

Such a system can include a circuit distribution housing having a fourth modular connector mounted for access on an outside surface of the housing, the fourth modular connector having a plurality of fourth contacts for mating with the plurality of third electrical contacts, wherein the plurality of third and fourth contacts are mounted within the third and fourth connectors respectively in a complementary arrangement that is adapted to enable the plurality of third and fourth contacts to be readily manually mated with each other and to be readily manually disengaged from each other.

The first contacts of the first connector typically comprise electrically conductive receptacles surrounded by an electrically non-conductive or shielding material and the second contacts of the second connector comprise electrically conductive projections that are each selectively shaped to snugly fit within a corresponding complementarily shaped receptacle of the first connector. The third contacts of the third connector typically comprise electrically conductive receptacles surrounded by an electrically non-conductive or shielding material and the fourth contacts of the fourth connector comprise electrically conductive projections that are each selectively shaped to snugly fit within a corresponding complementarily shaped receptacle of the third connector.

In another aspect of the invention there is provided a method of distributing electrical power in an enclosed building environment comprising:

routing an original source of electrical power into a housing mounted on a floor surface such that the housing is readily manually accessible by a user standing on the floor surface;

splitting the source of power within the housing into a plurality of circuits of at least about 5 amperes or at least about 42 volts at 50/60 hertz;

connecting each of the plurality of circuits to a plurality of corresponding conductive wires;

connecting each of the plurality of first wires to a plurality of corresponding first conductive receptacles mounted in an electrically nonconductive support material, the first conductive receptacles being arranged in the support material in a predetermined geometrical arrangement that is mounted to be manually accessible from an exterior location of the housing;

manually inserting a plurality of second electrically conductive projections simultaneously into snug fit engagement within the first conductive receptacles, the plurality of electrically conductive projections being mounted in an arrangement that is complementary in geometry to the predetermined geometrical arrangement of the first conductive receptacles;

connecting each of the plurality of second electrically conductive projections to a corresponding plurality of second conductive wires for interconnection to plurality of corresponding remotely located electrically power driven devices.

The above-described method preferably further comprises:

connecting the second plurality of wires to a corresponding plurality of second electrically conductive receptacles that are mounted in an electrically nonconductive support material, the second conductive receptacles being arranged in the support material in a second predetermined geometrical arrangement;

manually inserting a plurality of third electrically conductive projections into snug fit engagement within the second conductive receptacles, the plurality of third electrically conductive projections being mounted in an arrangement that is complementary in geometry to the second predetermined geometrical arrangement of the second conductive receptacles;

connecting the plurality of third electrically conductive projections to a corresponding plurality of third wires for interconnection to a remotely located electrically power driven device.

Most preferably, the predetermined geometrical arrangement is selected such that the plurality of second electrically conductive projections are only insertable within the receptacles in a single orientation.

In another aspect of the invention there is provided an electrical power distribution system comprising:

a housing mounted on a ground level surface in a location that is readily manually accessible by a user standing on the ground level surface, the housing containing a circuit splitting mechanism that splits an original source of electrical power into a plurality of high voltage or amperage circuits;

a first modular connector mounted for access on an outside surface of the housing, the first modular connector comprising a plurality of first conductive contacts, each first contact being electrically connected to a corresponding one of the plurality of circuits, the first contacts being mounted in an electrically nonconductive support material that deters manual contact by the user, the first contacts being arranged in the support material in predetermined mating pattern;

a second modular connector comprising a plurality of second conductive contacts for mating with the plurality of first contacts, each of the second contacts being electrically connected to one end of a corresponding one of a plurality of wires and mounted in the second modular connector in a pattern complementary to the predetermined mating pattern of the first contacts;

a third modular connector comprising a plurality of third conductive contacts for mating with a plurality of fourth conductive contacts, each of the third contacts being electrically connected to an opposite end of a corresponding one of the wires, the third contacts being mounted in an electrically nonconductive support material that deters manual contact by the user, the third contacts being arranged in the support material in predetermined mating pattern for mating with the fourth contacts.

In such an embodiment, the first and third contacts preferably comprise receptacles and the second and fourth contacts comprise projections that are readily manually snug fittable into and removable from the first and third contacts respectively. The first and second contacts are preferably arranged in a first unique mating pattern or arrangement and the third and fourth contacts are preferably arranged in a second unique mating pattern or arrangement different from the first pattern or arrangement. The projections of the first connector preferably have a longest projection having a longest selected length and either the receptacles or the projections of the first and second connectors are surrounded by a collar having a selected depth that is at least as large as the longest selected length of the longest projection of the second connector. The projections of the fourth connector preferably have a longest projection having a longest selected length and either the receptacles or the projections of the third and fourth connectors are surrounded by a collar having a selected depth that is at least as large as the longest selected length of the longest projection of the fourth connector.

DETAILED DESCRIPTION

Figure 1:
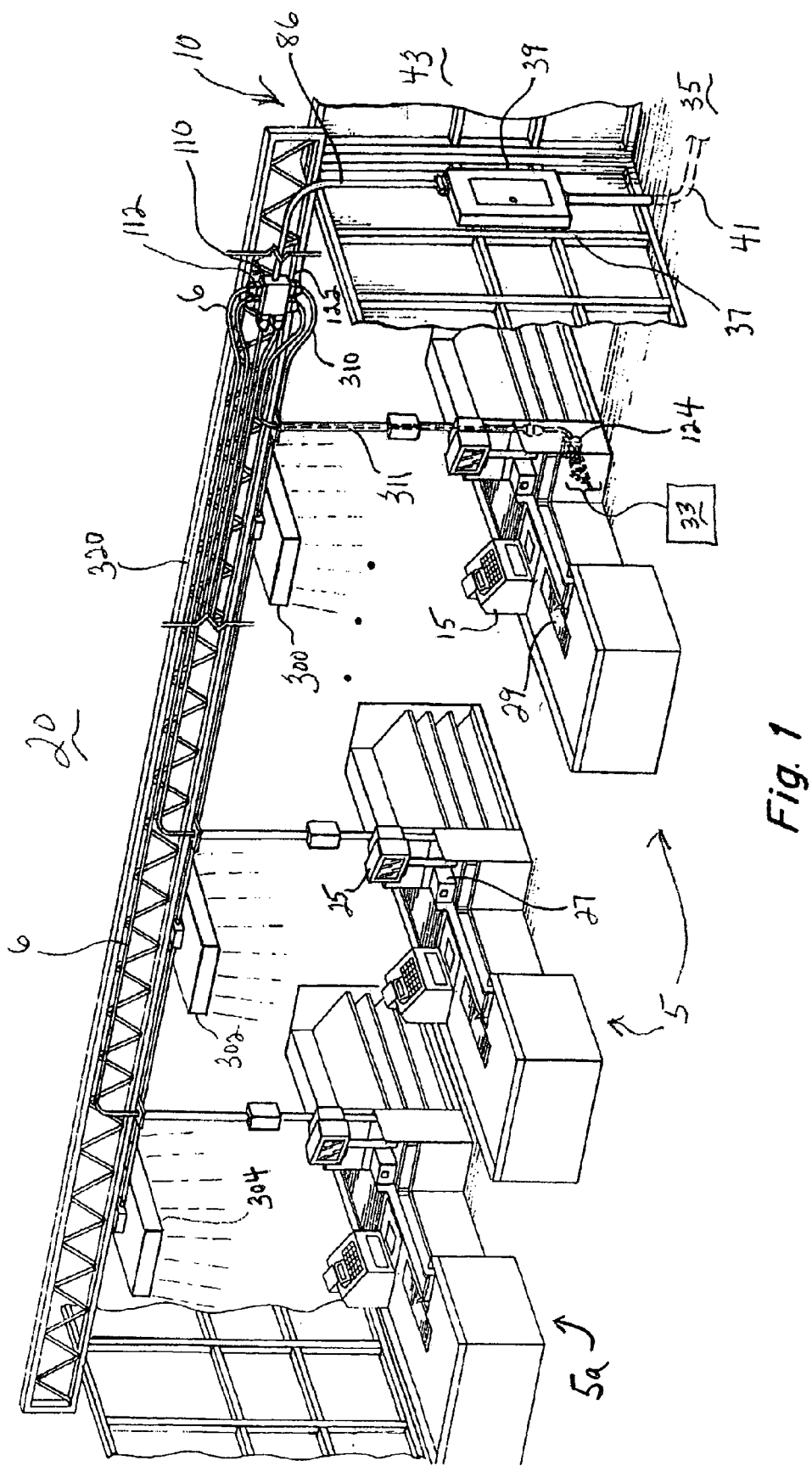
FIG. 1 is perspective view of a series of adjacently arranged checkout stations in a retail store environment showing at each station a plurality of electrically powered devices and a typical system according to the invention for routing and interconnecting electrical power to the devices.

FIG. 1 shows one example of a power distribution system 10 according to the invention installed in a retail store environment 20. The retail store environment 20 as shown includes a series of adjacently disposed checkout stations 5, each station having multiple electrical power driven devices such as a cash register 15, a monitor 25, a storage device 27, a bar code scanner 29 and an electrical power delivery outlet 124 to which one or more other electrically powered devices 33 are connected via conventional plug-in to the outlet 124. As shown, the source of electrical power for all such devices originates from an external source that is connected to the system 10 via wiring 41 which is connected to and carrying the external source of power. The live master feed or source of electrical current wiring 41 from an external source is routed to the interior of the building, typically to a separate enclosed room 43 that is isolated from the remainder of the building. The master feed wire is typically routed into a housing 39 that is mounted on an interior wall, support or mounting structure 37. The housing 39 is mounted at a height level above the floor level surface 35 that is readily accessible by hand so that a maintenance or operational person is readily able to access a series of circuit breakers or fuses that are typically connected to a splitter mechanism for splitting the main circuit feed 41 within the housing or circuit breaker box 39. The housing 39 is typically provided with a small door 38 that a person or user of the system 10 can readily manually access and open when standing on the floor 35 to expose the interior of the housing 39 and gain access to a plurality of circuit breakers or fuses 51, FIG. 4. The primary feed 41 of electrical power and the split circuits typically have/contain relatively high electrical power/voltage relative to the amount/degree of power/voltage that is used for carrying out general buiding electrical requirements and typically 500 to 1,000,000 times the amount of current/amperage and/or voltage that is used in conventional systems for processing, generating, storing or transmitting digital data signals, bits, bytes or other units of digital electronic data. The primary power feed 41 typically ranges from about 20 to about 3000 amperes or from about 42 up to about 600 volts at 50/60 hertz and the individual circuits 51 into which the primary feed 43 is split typically range in current draw from a minimum of about 5, typically about 20 to about 400 amperes of about a minimum of 42 up to about 600 volts at 50/60 hertz. Such range of current and voltage typically exists along the entirety of the physical mediums along which the circuits extend from the fuse/breakers 51 to the electrical devices which are powered by the system 10, including along, through and within the materials of which the receptacles and pins of the various modular connectors described below are comprised.

Figure 4:
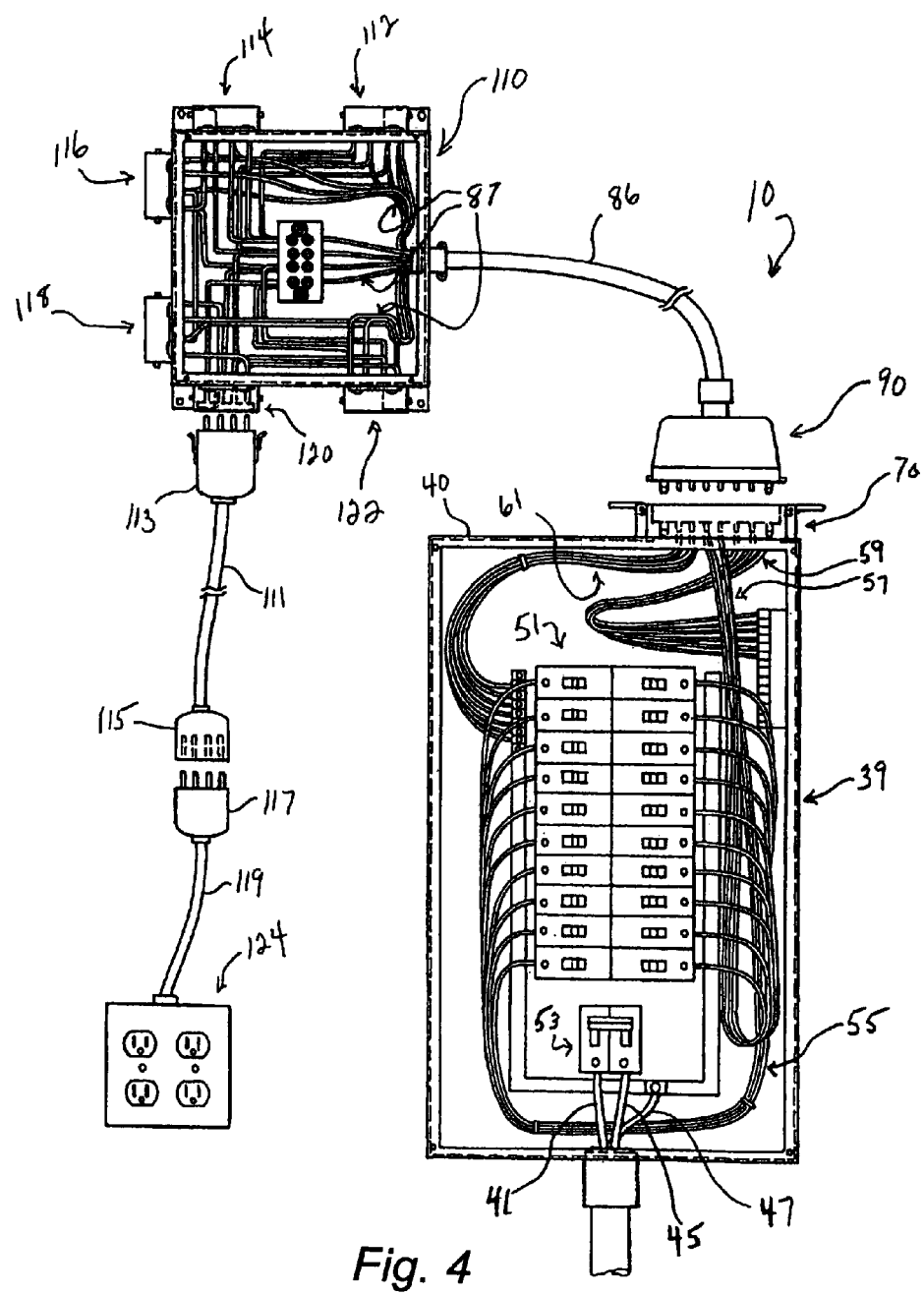
FIG. 4 is an open side view of the FIG. 2 system showing multiple circuit breakers or fuses mounted within the floor level housing and their wired connection to a modular connector mounted on an outside surface of the housing also showing a second complementary modular connector connected via a flexible tube that contains multiple wires connected to the connector pins, the wires extending through the length of the tube to an overhead wiring or circuit distribution box.

As shown in FIG. 4, where alternating current (AC) is concerned, the main original power circuit feed cable 43 works in conjunction with a master neutral cable 45 and a master ground cable 47. The master live feed circuit 43 is split in a conventional manner (not shown) such as via a pole and associated wiring connected to the pole into a multiplicity of separate circuits that are each individually connected to and controlled by a plurality of circuit breakers or fuses 51 that limit the maximum amount of voltage and/or current that any particular split circuit can carry. As shown in FIG. 4 the system 10 includes a master circuit breaker or fuse 53 that limits the voltage/current flow through the entire split current system, each split circuit running in parallel to each other. Each one of the plurality of circuit breakers 51 and, as shown in the FIG. 4 embodiment, the ground wire/cable 47, are individually conductively connected via a plurality of individual conductive wires 57, 59, 61 to individual ones of a plurality of electrically conductive receptacles 63, 65, 67 that collectively serve to comprise a first modular connector 70 as detailed in FIG. 6.

Figure 5:
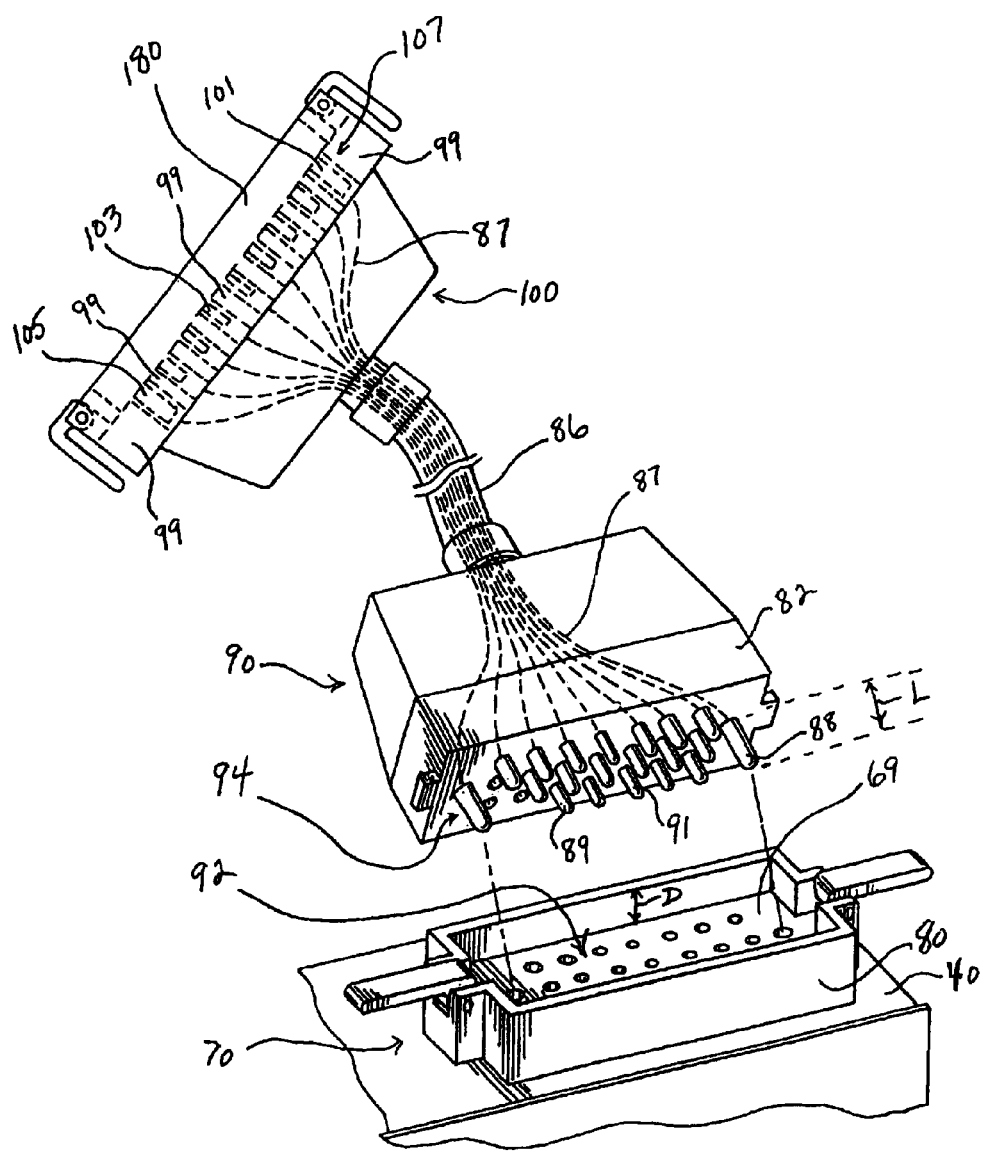
FIG. 5 is a perspective view of the connector and flexible components of the FIG. 3 system showing some of the details of the mounting arrangement of the electrically conductive receptacles of one connector and of the electrically conductive pins or projections of a complementary connector as well as showing in schematic some of the wiring connections between the pins of one of the connectors and the receptacles of another connector disposed on a distal end of the flexible tube.
Figure 6:
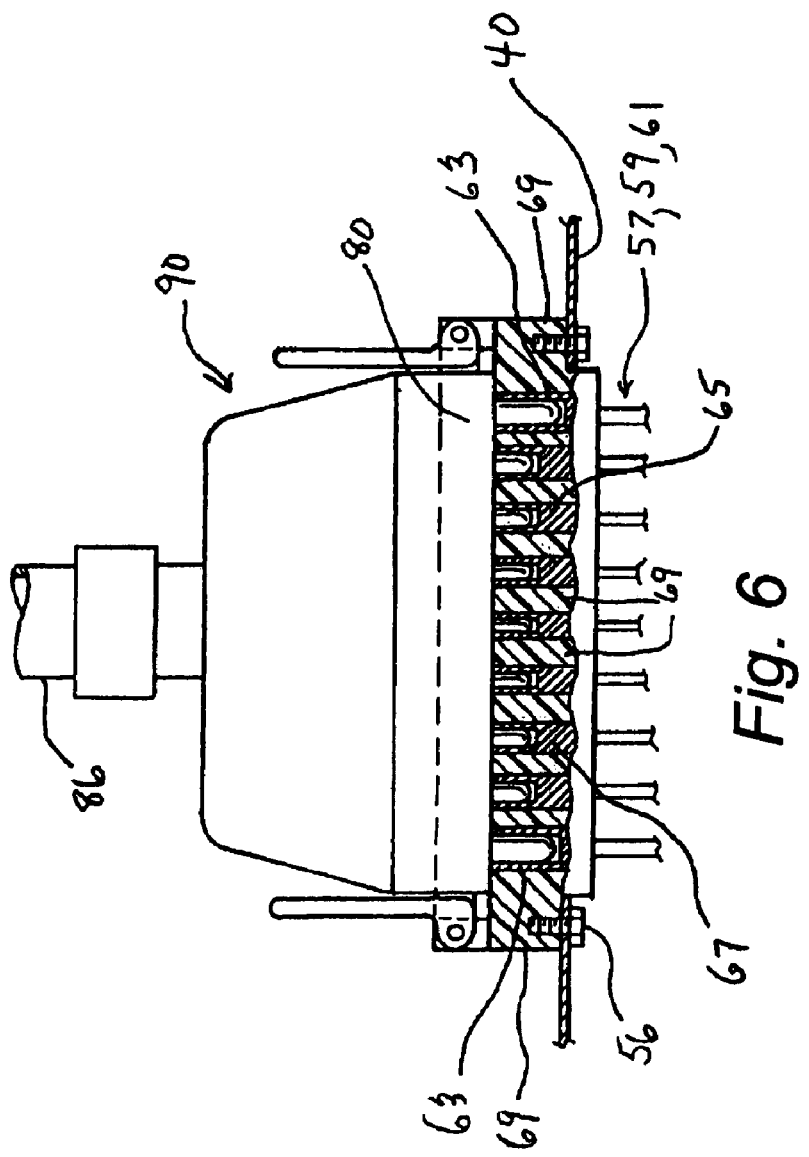
FIG. 6 is a side, partially sectional view of two complementary connectors in complete electrically conductive snug-fit engagement with each other.

The conductive receptacles 63, 65, 67 are typically configured in the form of a cup, bowl or other recess-containing receptacle of conductive material. Or, one or more of the receptacles 92 (or 107 as described below) can comprise strips of conductive material mounted on the interior surface of a cup or receptacle shaped structure as shown in FIGS. 5&6. The conductive receptacles 63, 65, 67 are mounted/disposed within the matrix of an electrically non-conductive support material 69 which typically comprises a unitary body in which the outer surfaces of the receptacles are completely embedded or surrounded by the non-conductive material 69 such that a user of the system is unable to easily to make manual contact, or is mechanically/physically prevented from making contact, with any surface, inside or outside, of the receptacles 63, 65, 67 which are carrying live electrical current once conductively connected to the main original source 41 of electrical power. The conductive material of which the receptacles 63, 65, 67 are comprised is physically connected to the conductive material of the wires/cables 57, 59, 61 by conventional means such as soldering or by uniform formation of the wire material together with the receptacle structure out of the same body of conductive material.

As shown in FIGS. 4, 5, 6, the body of non-conductive material 69 in which the receptacles 63, 65, 67 (92 generally) of the first connector 70 are embedded is mounted via screws 56 to the wall 40 of the housing 39 within or above an aperture provided in the wall 40 such that the recesses of the receptacles 63, 65, 67 are accessible from the exterior of the housing 39 to enable ready manual insertion of pins or projections 88, 89, 91 of a second complementary male connector 90. As shown in the FIGS. 4, 5, 6 embodiment, the first modular connector 70 includes a collar 80 surrounding the non-conductive material body 69. The collar 80 is configured so as to form a recess for receipt of a complementarily shaped portion 82 of the second connector 90. The collar 80 further serves to physically/mechanically obstruct or deter manual access to or engagement with the interior of the receptacles 63, 65, 67 for safety purposes.

In the embodiment shown in FIG. 5, the second modular connector 90 has a plurality of pins 94 comprising individual pins of different sizes having different cross-sectional diameters and lengths 88, 89, 91. The arrangement of and the sizes of the plurality of pins 94 are selected to be complementary to the arrangement of and the individual sizes, i.e. depth, diameter, width, etc. of the plurality of receptacles 92 of the first connector 70 such that the plurality of projections or pins 94 can only be inserted into the recesses of the plurality of receptacles 92 in a single pre-selected orientation as shown in FIG. 6. In other words the connector 70 and 90 are keyed to each other such that they can only be connected as shown in FIG. 6 in a single unique orientation such that another modular connector cannot be mated with either of the two unless such another modular connector is identical in arrangement and size of either pins or receptacles. Although the embodiment shown in FIG. 5, shows pins of differing sizes, e.g. 91 and 94, the sizes of the plurality of pins and/or receptacles can all be selected to be the same or uniform. It is the arrangement of the mounting of the pins/projections and of the receptacles that is preferably selected to be unique (and complementary) in order to provide the keying or uniqueness of complementary arrangement of one connector to another for safety purposes. Each individual one of the pins 94 is comprised of an electrically conductive material, typically the same material as the material of which the receptacles are comprised which is typically a highly conductive metal material such as copper, nickel, iron, gold or the like alloys of one or more of such metals. In a preferred embodiment, the receptacles 92 have recesses that are shaped/sized so as to receive a corresponding one of the pins 94 in a manner that results in a snug fit engagement of the outside surfaces of the pins 94 with the outside surfaces of the recesses of the receptacles 92 such that a firm conductive engagement of metal surface on metal surface is formed when the pins 94 are fully inserted within receptacles 92.

As shown in FIG. 5, preferably, the depth D of the collar 80 is at least as large as or larger than the length L of the longest one 88 of the plurality of pins 94 so that none of the pins 94 can make physical conductive contact with one of the receptacles 92 and become electrically live until the full length of each/all of the pins 94 is fully housed or surrounded by the portion of collar 80 that extends above the top surface of the mounting block 69 in which the receptacles 92 are mounted/embedded. In this manner, the user cannot ever make manual contact with an electrically live metal pin 94. Because the receptacles 92 are fully surrounded by the electrically non-conductive substrate 69, it is difficult if not impossible for a user to make physical, manual contact with a live metal surface of one of the receptacles, the collar 80 further serving to deter/prevent such manual contact.

Figure 2:
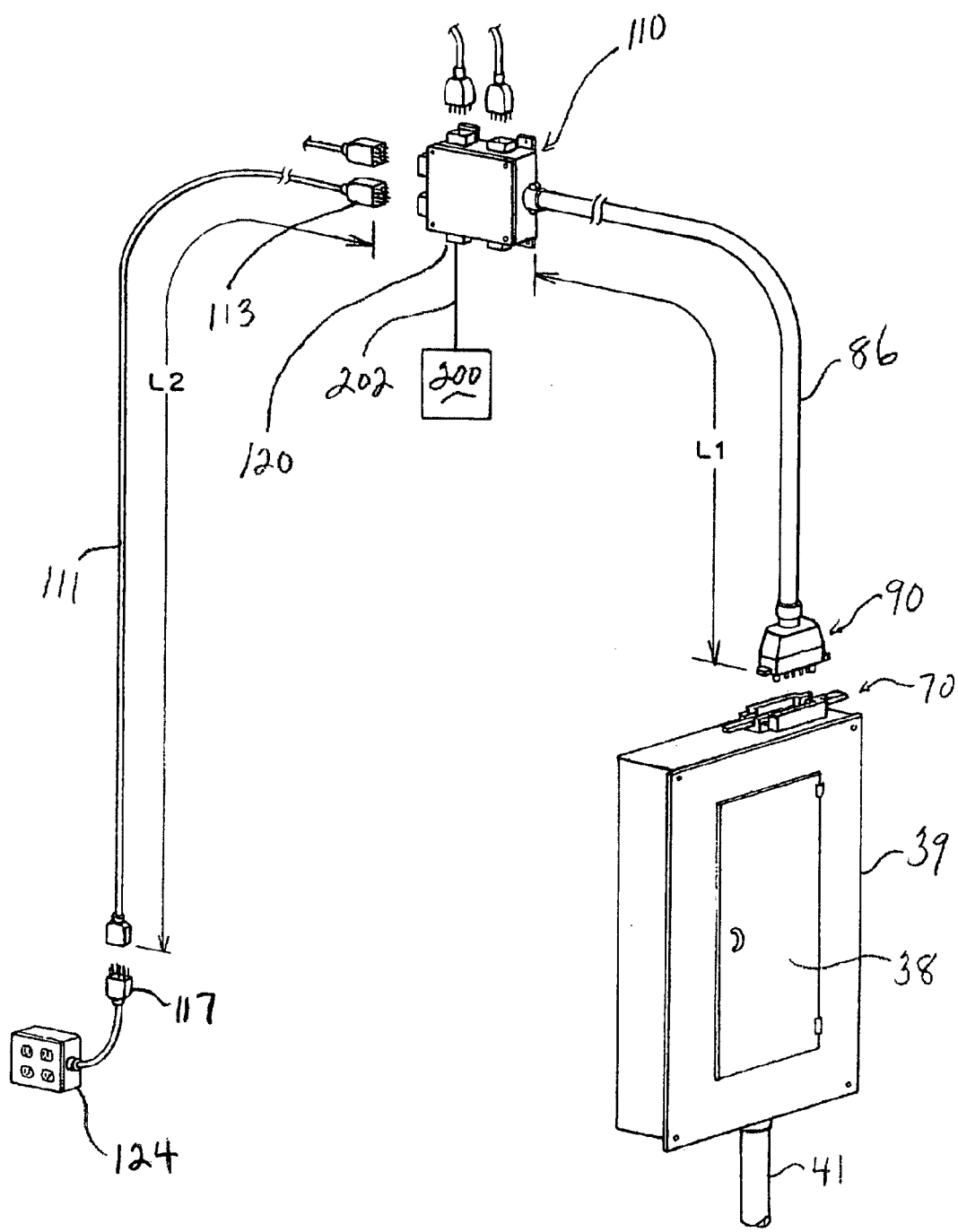
FIG. 2 is a perspective view of a multiple circuit housing mounted at floor level electrically connected via modular connectors and modular flexible tube components to an overhead mounted circuit/power distribution housing.

As shown in FIGS. 4, 5 each individual one of the pins/projections 94 of the connector 90 are separately conductively connected to one end of an electrically conductive wire, cable or the like 87. Each individual one of the wires 87 thus carries and corresponds to an individual one of the plurality of circuits that are split and formed within the housing 39. As shown, the collection of wires 87 are housed within and extend throughout the full length of a flexible tubular housing 86, FIGS. 1-5. In the embodiment shown in FIGS. 1, 2, 4, the distal end of the individual wires/cables 87 are routed out of the distal end of the flexible tube 86 directly through an aperture in a second housing 110 that acts as a distribution center for housing and organizing the distribution of the individual circuits to an electrically powered device. As shown in FIGS. 1, 4, the distribution housing 110 is typically mounted overhead within a large building out ready manual reach/access by persons standing on the floor level surface 35. As shown in FIGS. 1, 4, the plurality of wires can be routed within the distribution housing 110 to multiple electrical conductive connectors 112-122. One or more of the connectors 112-122 can be conductively connected directly to an electrically powered device or they can be connected to another multiple circuit electrical distribution outlet such as outlet 124 for connection to multiple devices 33 at any one or more stations where multiple electrically powered devices are located. As shown, the overhead housing 110 acts as a center of electrical circuit distribution and organization that simplifies the organization of the distribution of circuits for the user of the building space and its electrically powered devices. Each of the connectors 112-122 can be interconnected locally at a nearby station 5 or at a remote station 5a via further routing of individual circuits through wires housed in and extending remotely via extended tubes, e.g. tube 6, FIG. 1.

In a most preferred embodiment, the distal ends of the plurality of wires 87 extending through tubular housing 86 are first routed to a third modular connector 100. The third modular connector comprises a plurality of receptacles 107 that are mounted/embedded within a non-conductive material 99 in a manner similar to the mounting and arrangement of receptacles 92 within material 69 of the first modular connector 70. The distal ends of the wires 87 are conductively interconnected to the receptacles 107 in the same manner as wires 57, 59, 61 were described as being conductively connected to receptacles 63, 65, 67. In the same manner as described with reference to connector 90, housing 110 is provided with a male connector 190 having a plurality of pins/projections for snug-fittable insertion within the recesses of receptacles 107. The male connector 190 has a body portion 191 that is complementary in geometry to the recess formed by collar 180 such that the body portion 191 can be readily manually inserted within the recess formed by collar 180 in the same manner as body portion or surface 82 of connector 90 is readily insertable into the recess of depth D created by collar 80. Again, because the receptacles 107 are live, once the connectors 70, 90 are connected, the distal modular connector 100 is preferably provided with a collar 180 that has a depth that is at least as large as or larger than the length of the longest one of the plurality of pins 194 so that none of the pins 194 can make physical conductive contact with one of the receptacles 107 and become electrically live until the full length of each/all of the pins 194 is fully housed or surrounded by the portion of collar 180 that extends above the top surface of the mounting block 99 in which the receptacles 107 are mounted/embedded. As shown in FIG. 5 and similar to the design described with reference to connector 70, the plurality of receptacles 107 of connector 100 can comprise individual receptacles 101, 103, 105 that are different in size and shape that are complementary to individual pins of the plurality of pins 192 for purposes of creating a safety uniqueness that requires mating in a unique orientation and that prevents the mating of differently configured connectors with each other. In any event the specific arrangement of mounting of the pins/ projections 194 and the receptacles 107 are preselected such that the pins and receptacles only mate in a unique or keyed orientation.

The size, mass or other configuration of all of the receptacles and projections 92, 94, 107, 194 of all of the connectors 70, 90, 100, 190 are selected to enable a current transfer between correspondingly mated receptacles and projections that is 500 to 1,000,000 times the amount of current/ amperage and/or voltage that is typically used in conventional systems for processing, generating, storing or transmitting digital data signals, bits, bytes or other units of digital electronic data. Each of the first, second, third and fourth connectors have a minimum of 5 separate high power or voltage circuit carrying contacts and typically a minimum of 8 and most preferably a minimum of 10.

In applications where alternating current are employed, both the first 70/second 90 and third 100/fourth 190 connectors preferably have a single projection and corresponding single receptacle that are interconnected to and serve as the master neutral wire/cable 45 for all of the plurality of circuits that are split/contained within the circuit splitter box 39 and carried/distributed via each connector. Similarly in such AC applications, both the first 70/second 90 and third 100/fourth 190 connectors typically have another single projection and corresponding receptacle that are interconnected to and serve as the master ground wire/cable 47 for all of the circuits that are split/contained within the circuit splitter box 39.

Figure 3:
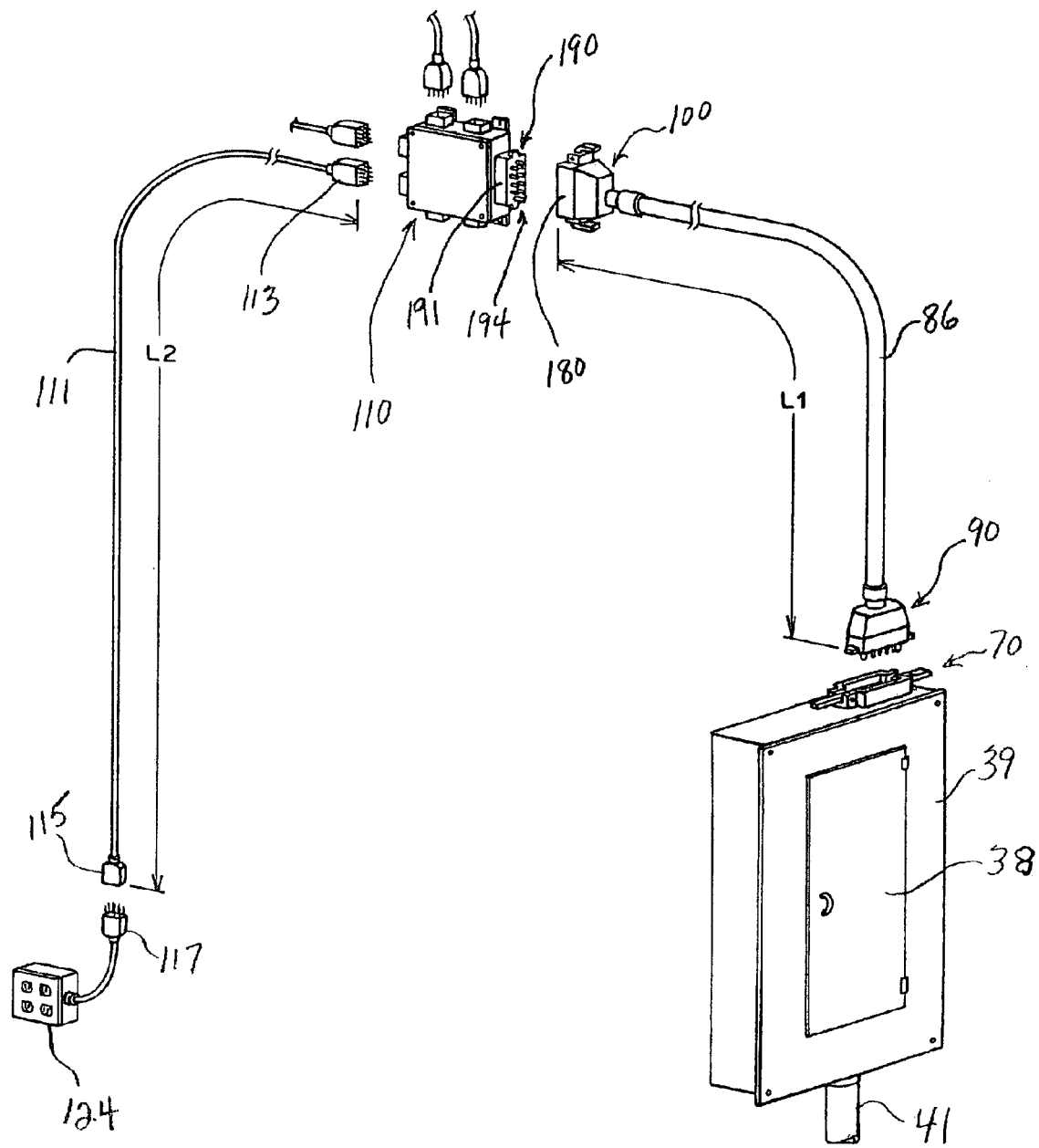
FIG. 3 is a perspective view of a multiple circuit housing mounted at floor level electrically connected via modular connectors and modular flexible tube components to an overhead mounted circuit/power distribution housing which is in turn connected via modular connectors to the cable.

As shown in FIGS. 3, 5, 6, each of the connectors 70, 90, 100, 190 are configured and adapted to be unitary in structure devices that contain, house and support multiple separate conductive contacts each of which is separately capable of carrying and conducting a circuit of relatively high current or voltage. Each connector 90, 100 that is mounted on an end of the flexible tubular housing is readily manually connectable to a corresponding connector 70, 190.

As shown in FIG. 4, for example, the remote distribution outlet 124 may be interconnected to the appropriate wires contained within the primary overhead distribution housing via a flexible cable 111 having further connectors 113, 115 at either end of the cable 111 that interconnect respectively to a complementary connector 120 mounted on the overhead distribution housing 110 and to a complementary connector 117 of a cable 119 that connects directly to outlet 124. In the same manner, an electrically powered device such as a lighting fixture 300, 302, 304, FIG. 1 (connected via outlet connector 122 and flexible cable 310) or video monitor 200, FIG. 2 (connected via connector 120 and flexible cable 202), can be interconnected directly to one of the connectors of distribution housing 110 via the use of appropriate conductive cabling and connectors directly between the device and one or more of the connectors 112-122.

As shown in FIG. 1, the distribution housing 110 is typically mounted overhead on a mounting platform 320 beyond ready manual access from floor level. Conductive electrical connections to stations 5a, 5 are effected via cables mounted along the length of the platform 320 connected at one end to the distribution housing via one or more of the connectors 112-122. The central electrical power room 43 containing the circuit splitter housing 39 is typically disposed/located anywhere between about 25 and about 2000 feet away from the remote stations 5a, 5, lights 300, 302, 304 or other devices or outlets to which the split circuits within box 39 are ultimately interconnected. The length L1, FIGS. 2, 3, of the cable 86 and its associated plurality of wires 87 thus typically ranges between about 25 and about 2000 feet, more typically between about 25 about 300 feet in length. The length L2 of the cable or wire interconnection between the distribution housing 110 and an electrically powered device or a distribution outlet, e.g. cable 6, 310 or 311, FIGS. 1, 2, 3, typically ranges between about 10 and about 100 feet. Thus the preconfigured standardized design of the cable 86 and its associated modular components 70, 90, 100, 190 of the system 10 enables the relatively easy installation of cabling downstream of distribution housing 110 such as via cables 6, 111, 310, 311, FIGS. 1-3. The preconfigured standardized system 10 provides all of the electrical power necessary in preconfigured circuits along preconfigured arrangements of wires 87 to power any area within the interior 20 of the building without the necessity of having to separately construct and devise a pattern and housing for a multiplicity of split circuits 51 from the source 41 that must then, once split, be separately interconnected by individual wires over long distances to individual devices or outlets located at remote stations 5a, 5.

The use in the system 10 of a pair of unitary, preconfigured connectors, 70, 90 that are keyed to each other and that each contain a plurality of high current/voltage carrying contacts enables the basic source of external electrical power 41 to be routed and distributed within/throughout the interior 20 without installation, matching or interconnection of individual cables or wires between the source 41 and the interior 20 of the building. The further inclusion of a second pair of unitary, preconfigured connectors, 100, 190 at the distal end of wires 87 that are keyed to each other and that each contain a plurality of high current/voltage carrying contacts further reduces the need for custom or labor intensive installation of individual cables or wires between the source 41 and the interior 20 of the building.

What is claimed is:

1. An electrical power distribution system comprising:
an original source of electrical power;
a housing mounted on a ground level surface in a location that is readily manually accessible by a user standing on the ground level surface, the original source of electrical power being routed into the housing, the housing containing a splitting mechanism that splits the original source of power into a plurality of circuits;
a first modular connector mounted for access on an outside surface of the housing, the first modular connector having a plurality of first electrical contacts, each first contact being electrically connected to a corresponding one of the plurality of circuits;
an elongated flexible tube housing a plurality of electrically conductive wires, the tube having a second modular connector mounted at one end of the tube, the second modular connector having a plurality of second electrical contacts for mating with the plurality of first electrical contacts, each of the second contacts being electrically connected to one end of a corresponding one of the plurality of wires;
wherein the plurality of first and second contacts are mounted within the first and second connectors respectively in a complementary mating arrangement that is adapted to enable the first and second contacts to be readily manually mated with each other and to be readily manually disengaged from each other, the first and second contacts being adapted to conduct elevated current or voltage between the contacts;
wherein the elongated flexible tube has a third modular connector mounted at another end of the tube opposite the one end of the tube, the third modular connector having a plurality of third electrical contacts, each of the third contacts being electrically connected to an opposite end of a corresponding one of the wires;
the system further comprising a circuit distribution housing having a fourth modular connector mounted for access to an outside surface of the housing, the fourth modular connector having a plurality of fourth contacts for mating with the plurality of third electrical contacts, wherein the plurality of third and fourth contacts are mounted within the third and fourth connectors respectively in a complementary arrangement that is adapted to enable the plurality of third and fourth contacts to be readily manually mated with each other in a predetermined pattern and to be readily manually disengaged from each other, the third and fourth contacts being adapted to conduct elevated current or voltage between the contacts.

2. The system of claim 1 wherein the plurality of fourth connectors are each connected to a corresponding wire that is housed at least in part within the circuit distribution housing, the circuit distribution housing being mounted in a location remote from the housing mounted on the ground level surface.

3. The system of claim 1 wherein each of the first and second contacts comprise a material adapted to enable a circuit to conduct between the first and second contacts having a current of at least about 5 amperes or having a voltage of at least about 42 volts.

4. The system of claim 1 wherein each of the plurality of first contacts and their corresponding second contacts have a pre-selected complementary dimensional configuration, the pre-selected dimensional configuration of the plurality of contacts being selected such that the first and second contacts can only be mated together in a single selected mating orientation.

5. The system of claim 1 wherein the first contacts of the first connector comprise electrically conductive receptacles surrounded by an electrically non-conductive or shielding material and the second contacts of the second connector comprise electrically conductive projections that are each selectively shaped to snugly fit within a corresponding complementarily shaped receptacle of the first connector.

6. The system of claim 1 wherein the third contacts of the third connector comprise electrically conductive receptacles surrounded by an electrically non-conductive or shielding material and the fourth contacts of the fourth connector comprise electrically conductive projections that are each selectively shaped to snugly fit within a corresponding complementarily shaped receptacle of the third connector.

* * * * *